(12) United States Patent
Cui et al.

(10) Patent No.: US 12,185,256 B2
(45) Date of Patent: Dec. 31, 2024

(54) TECHNIQUES FOR PATHLOSS REFERENCE SIGNAL ENHANCEMENTS

(71) Applicant: Apple Inc., Cupertino, CA (US)

(72) Inventors: Jie Cui, San Jose, CA (US); Dawei Zhang, Saratoga, CA (US); Yushu Zhang, Beijing (CN); Yang Tang, San Jose, CA (US); Qiming Li, Beijing (CN); Manasa Raghavan, Sunnyvale, CA (US); Huaning Niu, San Jose, CA (US); Hong He, San Jose, CA (US); Haitong Sun, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 402 days.

(21) Appl. No.: 17/442,510

(22) PCT Filed: Sep. 14, 2021

(86) PCT No.: PCT/US2021/050250
§ 371 (c)(1),
(2) Date: Sep. 23, 2021

(87) PCT Pub. No.: WO2022/086644
PCT Pub. Date: Apr. 28, 2022

(65) Prior Publication Data
US 2023/0101089 A1 Mar. 30, 2023

(51) Int. Cl.
*H04W 52/14* (2009.01)
*H04W 52/24* (2009.01)
*H04W 52/36* (2009.01)

(52) U.S. Cl.
CPC ....... *H04W 52/146* (2013.01); *H04W 52/242* (2013.01); *H04W 52/367* (2013.01)

(58) Field of Classification Search
CPC ............ H04W 52/146; H04W 52/242; H04W 52/367; H04L 5/0048
See application file for complete search history.

(56) References Cited

U.S. PATENT DOCUMENTS

| | | | |
|---|---|---|---|
| 2008/0260000 A1 | 10/2008 | Periyalwar et al. | |
| 2013/0258882 A1* | 10/2013 | Dinan | H04W 74/0833 370/336 |

(Continued)

OTHER PUBLICATIONS

International Patent Application No. PCT/US2021/050250, Invitation to Pay Additional Fees and, Where Applicable, Protest Fee, Nov. 2, 2021, 2 pages.

(Continued)

*Primary Examiner* — Jinsong Hu
*Assistant Examiner* — Rui M Hu
(74) *Attorney, Agent, or Firm* — Kilpatrick Townsend & Stockton LLP

(57) ABSTRACT

In at least one embodiment, a user equipment (UE) may receive a control signal from a base station to update a target pathloss reference signal from an existing pathloss reference signal. In at least one embodiment, the UE may obtain a plurality of samples of the target pathloss reference signal. In at least one embodiment, the UE may determine, based on obtaining the plurality of samples of the target pathloss reference signal, that the UE is unable to update the target pathloss reference signal. In at least one embodiment, the UE may adjust the uplink transmission power of the UE based on the existing pathloss reference signal or to a maximum transmit power based on said determining that the UE is unable to be updated to the target pathloss reference signal.

14 Claims, 10 Drawing Sheets

(56) References Cited

U.S. PATENT DOCUMENTS

| | | | |
|---|---|---|---|
| 2013/0324182 A1 | 12/2013 | Deng et al. | |
| 2014/0087782 A1 | 3/2014 | Zhang et al. | |
| 2014/0169321 A1 | 6/2014 | Imamura et al. | |
| 2018/0049137 A1 | 2/2018 | Li et al. | |
| 2020/0351674 A1* | 11/2020 | Zhou | H04L 5/0048 |
| 2020/0374806 A1* | 11/2020 | Manolakos | H04W 52/325 |
| 2021/0029650 A1* | 1/2021 | Cirik | H04W 52/248 |
| 2021/0050963 A1* | 2/2021 | Zarifi | H04W 56/001 |
| 2021/0051507 A1* | 2/2021 | Lin | H04W 16/14 |
| 2021/0084510 A1* | 3/2021 | Ryu | H04W 72/21 |
| 2021/0159991 A1* | 5/2021 | Zhou | H04W 24/08 |
| 2021/0185617 A1* | 6/2021 | Zhou | H04W 52/146 |
| 2021/0266845 A1* | 8/2021 | Zhou | H04W 52/146 |
| 2022/0030521 A1* | 1/2022 | Cirik | H04W 52/242 |
| 2022/0264478 A1* | 8/2022 | Miao | H04W 52/242 |
| 2022/0312342 A1* | 9/2022 | Cha | H04L 5/0051 |
| 2022/0322246 A1* | 10/2022 | Cirik | H04W 52/365 |
| 2022/0338127 A1* | 10/2022 | Gao | H04W 52/42 |
| 2022/0346028 A1* | 10/2022 | Cirik | H04W 52/54 |
| 2022/0360378 A1* | 11/2022 | Zarifi | H04L 5/0091 |
| 2022/0361114 A1* | 11/2022 | Zhao | H04W 52/146 |
| 2022/0394499 A1* | 12/2022 | Matsumura | H04L 5/0051 |
| 2023/0084239 A1* | 3/2023 | Cha | H04W 52/241 455/522 |
| 2023/0111603 A1* | 4/2023 | Ghimire | H04B 7/0421 455/456.1 |
| 2023/0180023 A1* | 6/2023 | Yang | H04L 5/0051 370/329 |
| 2023/0275728 A1* | 8/2023 | Chung | H04W 52/42 370/329 |
| 2023/0337142 A1* | 10/2023 | Go | H04W 52/242 |

OTHER PUBLICATIONS

CR for introduction of pathloss reference signal switching delay, 3GPP TSG RAN WG4 Meeting #96-e, R4-2012148, Aug. 17-28, 2020, 2 pages.

3rd Generation Partnership Project; Technical Specification Group Radio Access Network; NR; Requirements for support of radio source management (Release 16), 3GPP TS 38.133 V16.5.0, Sep. 2020, 1608 pages.

3rd Generation Partnership Project; Technical Specification Group Radio Access Network; NR; Physical layer procedures for control (Release 16), 3GPP TS 38.213 V16.3.0, Sep. 2020, 179 pages.

International Patent Application No. PCT/US2021/050250, International Preliminary Report on Patentability, May 4, 2023, 9 pages.

Haider et al., "Maximum Transmit Power for UE in an LTE Small Cell Uplink", Available Online at: https://www.mdpi.com/2079-9292/8/7/796, Electronics, vol. 8, Issue 7, Jul. 16, 2019, pp. 1-26.

International Patent Application No. PCT/US2021/050250, International Search Report and Written Opinion, Mailed on Feb. 10, 2022, 12 pages.

Technical Specification entitled 3rd Generation Partnership Project; Technical Specification Group Radio Access Network; NR; Requirements for support of radio resource management (Release 16); 3GPP TS 38.133 V16.5.0 (Sep. 2020) in 1608 pages.

Change Request, 38.133 CR 0992, rev 1, Current version: 16.4.0, Title: CR for introduction of pathloss reference signal switching delay, Source to WG: MediaTek Inc., 3GPP TSG-RAN WG4 Meeting #96-e, R4-2012148, Electronic Meeting Aug. 17-28, 2020 in 2 pages.

\* cited by examiner

TECHNIQUES FOR PATHLOSS REFERENCE SIGNAL ENHANCEMENTS

CROSS-REFERENCE TO RELATED APPLICATION

This application is a U.S. National Stage Application of PCT/US2021/050250, filed Sep. 14, 2021, which claims the benefit of PCT International Application No. PCT/CN2020/123000, filed Oct. 22, 2020, which are hereby incorporated by reference in their entirety for all purposes

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network. The UE can be one or more of a smart phone, a tablet computing device, a laptop computer, an internet of things (IOT) device, and/or another type of computing devices that is configured to provide digital communications. As used herein, digital communications can include data and/or voice communications, as well as control information.

The power level that the BSs and UEs transmit at has an impact on interference in the system. The management of uplink transmission power by the UE can reduce interference with other UEs and increase the battery life of the given UE. The uplink Transmit Power Control (TPC) can adapt to radio propagation channel conditions, including pathloss, shadowing and fast fade fluctuations, while reducing the interference effects from other user equipment, within the cell and from neighboring cells.

Figure 1:
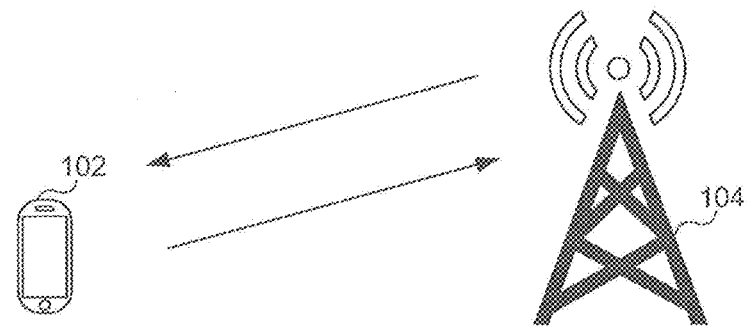
FIG. 1 illustrates a network environment in accordance with some embodiments.

Reference will now be made to the exemplary embodiments illustrated, and specific language will be used herein to describe the same. It will nevertheless be understood that no limitation of the scope of the technology is thereby intended.

DETAILED DESCRIPTION

The following detailed description of example implementations refers to the accompanying drawings. The same reference numbers in different drawings may identify the same or similar elements.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, description s of well-known devices, circuits, and methods are omitted so as not to obscure the description of the various embodiments with unnecessary detail. For the purposes of the present document, the phrase "A or B" means (A). (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), and a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "base station" as used herein refers to a device with radio communication capabilities, that is a network element of a communications network, and that may be configured as an access node in the communications network. A UE's access to the communications network may be managed at least in part by the base station, whereby the UE connects with the base station to access the communications network. Depending on the radio access technology (RAT), the base station can be referred to as a gNodeB (gNB), eNodeB (eNB), access point, etc. As used herein, the term "Base Station (BS)" includes "Base Transceiver Stations (BTS)," "NodeBs." "evolved NodeBs (eNodeB or eNB)," and/or "next generation NodeBs (gNodeB or gNB)," and refers to a device or configured node of a mobile phone network that communicates wirelessly with UEs.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel." "access channel," "data access channel." "link," "data link." "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

As used herein, the term "wireless access point" or "Wireless Local Area Network Access Point (WLAN-AP)" refers to a device or configured node on a network that allows wireless capable devices and wired networks to connect through a wireless standard, including Wi-Fi, Bluetooth, or other wireless communication protocol.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP).

In initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The main objectives of uplink power control are to limit both intracell and intercell interference, and to reduce UE power consumption. The 3GPP TS 38.213 v16.3.0 (2020-10-02) specifies uplink power control separately for the physical uplink shared channel (PUSCH), Physical Uplink Control Channel (PUCCH), Physical Random Access Channel (PRACH), and Sounding Reference Signal (SRS).

Conventional power control schemes attempt to maintain a constant signal to interference plus noise ratio (SINR) at the receiver. The UE can increase its transmit power to compensate pathloss that a signal may experience through a radio channel.

Fractional power control schemes allow the SINR to decrease as pathloss increases, e.g., the received SINR decreases as the UE moves towards cell edge. The UE transmit power increases at a reduced rate as the path loss increases, when compared to a conventional power control scheme, e.g., increases in path loss are only partially compensated Fractional power control schemes can improve air-interface efficiency and increase average cell throughputs by reduced intercell interference.

PUCCH may use a power control mechanism that is similar to PUSCH. However, the PUCCH may not support fractional power control so the UE may fully compensate the pathloss, unless the transmit power capability has become exhausted.

The SRS may use a power control mechanism that is similar to PUSCH. However, power control for the SRS may not include a Mission Critical Service (MCS) dependent term because the SRS does not transfer any information bits.

FIG. 1 illustrates a network environment 100 in accordance with some embodiments. The network environment 100 may include a UE 102 and a base station 104. The base station 104 may provide one or more wireless access cells, for example, 3GPP NR cells, through which the UE 102 may communicate with the base station 104. The UE 102 and the base station 104 may communicate over an air interface compatible with 3GPP technical specifications such as those that define Fifth Generation (5G) NR system standards. The base station 104 may be a next-generation-radio access network (NG-RAN) node that is coupled with a 5G core network. An NG-RAN nodes may be either a gNB to provide an NR user plane and control plane protocol terminations toward the UE 102 or an ng-eNB to provide evolved universal terrestrial radio access (E-UTRA) user plane and control plane protocol terminations toward the UE 102. The network environment 100 may include a number of other RAN nodes (for example, LTE-RAN or NG-RAN nodes), transmit-receive points, etc. that may support wireless coverage for the UE 102.

Figure 2:
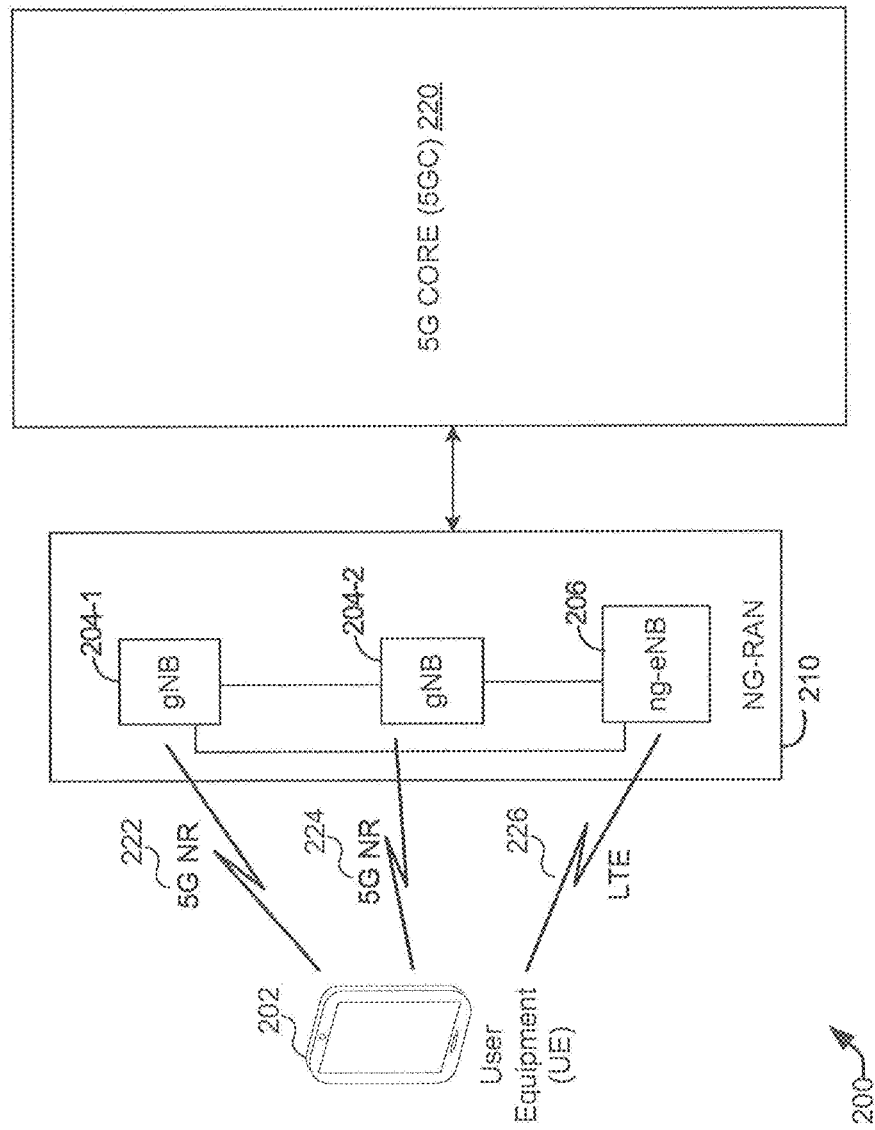
FIG. 2 illustrates an architecture of a wireless network with various components of the network in accordance with some embodiments.

FIG. 2 shows a diagram of a 5G New Radio (NR) communication system 200. Here, the 5G NR communication system 200 includes a UE 202, and components of an NG-RAN 210. A 5G network may also be referred to as an NR network and a NG-RAN 210 may be referred to as a 5G RAN or as an NR RAN. Standardization of an NG-RAN is ongoing in 3GPP. Accordingly. NG-RAN 210 may conform to current or future standards for 5G support from 3GPP.

Base stations in the NG-RAN 210 shown in FIG. 2 may correspond to base stations 104 in FIG. 1 and comprise a Transmission Reception Point (TRP), and may include NR NodeB (gNB) 204-1 and 204-2 (collectively and generically referred to herein as gNBs 204) and/or an antenna of a gNB. Pairs of gNBs 204 in NG-RAN 210 may be connected to one another (e.g., directly as shown in FIG. 2 or indirectly via other gNBs 204). Access to the 5G network is provided to UE 202 via wireless communication between the UE 202 and one or more of the gNBs 204, which may provide wireless communications access to the 5G Core Network 220 on behalf of the UE 202 using 5G NR. 5G NR radio access may also be referred to as NR radio access or as 5G radio access. In FIG. 2, the serving gNB for UE 202 is assumed to be gNB 204-1, although other gNBs (e.g. gNB 204-2) may act as a serving gNB if UE 202 moves to another location or may act as a secondary gNB to provide additional throughput and bandwidth to UE 202.

Base stations in the NG-RAN 210 shown in FIG. 2 may also or instead include a next generation evolved Node B, also referred to as an ng-eNB, 206. Ng-eNB 206 may be connected to one or more gNBs 204 in NG-RAN 210, e.g., directly or indirectly via other gNBs 204 and/or other ng-eNBs. An ng-eNB 206 may provide LTE wireless access and/or evolved LTE (eLTE) wireless access to UE 202. It is noted that while only one ng-eNB 206 is shown in FIG. 2, some embodiments may include multiple ng-eNBs 206.

The NG-RAN 210 can include one or more access points that enable the connections 222, 224, and 226. These access points can be referred to as access nodes, base stations (BSs), NodeBs, eNodeBs, gNodeBs, RAN nodes, RAN nodes, and so forth, and can comprise ground stations (e.g., terrestrial access points) or satellite access points providing coverage within a geographic area (e.g., a cell). The NG-RAN 210 may include one or more RAN nodes for providing macrocells and one or more RAN nodes for providing femtocells or picocells (e.g., cells having smaller coverage areas, smaller user capacity, and/or higher bandwidth compared to macrocells).

Any of the RAN nodes can terminate the air interface protocol and can be the first point of contact for the UE 202. In some embodiments, any of the RAN nodes can fulfill various logical functions for the NG-RAN 210 including, but not limited to, radio network controller (RNC) functions such as radio bearer management, uplink and downlink dynamic radio resource management and data packet scheduling, and mobility management.

In accordance with some embodiments, the UE 202 can be configured to communicate using Orthogonal Frequency-Division Multiplexing (OFDM) communication signals with each other or with any of the RAN nodes over a multicarrier communication channel in accordance various communication techniques, such as an Orthogonal Frequency-Division Multiple Access (OFDMA) communication technique (e.g., for downlink communications) or a Single Carrier Frequency Division Multiple Access (SC-FDMA) communication technique (e.g., for uplink), although the scope of the embodiments is not limited in this respect. The OFDM signals can comprise a plurality of orthogonal subcarriers.

The gNB 204 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers, and the physical channels may transfer information across the air interface. The physical channels may include a physical broadcast channel (PBCH); a physical downlink control channel (PDCCH); and a physical downlink shared channel (PDSCH).

The PBCH may be used to broadcast system information that the UE 202 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 202 during a cell search procedure and for beam selection.

The PDSCH may be used to transfer end-user application data, signaling radio bearer (SRB) messages, system information messages (other than, for example, Master Information Block (MIB)), and paging messages.

The PDCCH may transfer downlink control information (DCI) that is used by a scheduler of the gNB 204 to allocate both uplink and downlink resources. The DCI may also be used to provide uplink power control commands, configure a slot format, or indicate that preemption has occurred.

The gNB 204 may also transmit various reference signals to the UE 202. The reference signals may include demodulation reference signals (DMRSs) for the PBCH, PDCCH, and PDSCH. The UE 202 may compare a received version of the DMRS with a known DMRS sequence that was transmitted to estimate an impact of the propagation channel. The UE 202 may then apply an inverse of the propagation channel during a demodulation process of a corresponding physical channel transmission.

The reference signals may also include channel state information-reference signals (CSI-RS). The CSI-RS may be a multi-purpose downlink transmission that may be used for CSI reporting, beam management, connected mode mobility, radio link failure detection, beam failure detection and recovery, and fine-tuning of time and frequency synchronization.

The reference signals and information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain and one orthogonal frequency division multiplexing (OFDM) symbol in the time domain. Twelve consecutive subcarriers in the frequency domain may compose a physical resource block (PRB). A resource element group (REG) may include one PRB in the frequency domain and one OFDM symbol in the time domain, for example, twelve resource elements. A control channel element (CCE) may represent a group of resources used to transmit PDCCH. One CCE may be mapped to a number of REGs, for example, six REGs.

The UE 202 may transmit data and control information to the gNB 204 using physical uplink channels. Different types of physical uplink channels are possible including, for instance, a physical uplink control channel (PUCCH) and a physical uplink shared channel (PUSCH). Whereas the PUCCH carries control information from the UE 202 to the gNB 204, such as uplink control information (UCI), the PUSCH carries data traffic (e.g., end-user application data) and can carry UCI.

In an example, communications with the gNB 204 and/or the base station can use channels in the frequency range 1 (FR1) band (between 40 Mega Hertz (MHz) and 7,125 MHz) and/or frequency range 2 (FR2) band (between 24.250 MHz and 52,600 MHz). The FR1 band includes a licensed band and an unlicensed band. The NR unlicensed band (NR-U) includes a frequency spectrum that is shared with other types of radio access technologies (RATs) (e.g., LTE-License Assisted Access (LTE-LAA), Wi-Fi, etc.). A listen-before-talk (LBT) procedure can be used to avoid or minimize collision between the different RATs in the NR-U, whereby a device should applies a clear channel assessment (CCA)) check before using the channel.

The physical downlink shared channel (PDSCH) carries user data and higher-layer signaling to the UE 202. The physical downlink control channel (PDCCH) carries information about the transport format and resource allocations related to the PDSCH channel, among other things. It also informs the UE 202 about the transport format, resource allocation, and Hybrid Automatic Repeat Request (H-ARQ) information related to the uplink shared channel. Typically, downlink scheduling (assigning control and shared channel resource blocks to the UE 202 within a cell) is performed at any of the RAN nodes based on channel quality information fed back from any of the UE 202, and then the downlink resource assignment information is sent on the PDCCH used for (e.g., assigned to) each of the UE 202.

The PDCCH uses control channel elements (CCEs) to convey the control information. Before being mapped to resource elements, the PDCCH complex-valued symbols are first organized into quadruplets, which are then permuted using a sub-block inter-leaver for rate matching. Each PDCCH is transmitted using one or more of these CCEs, where each CCE corresponds to nine sets of four physical resource elements known as resource element groups (REGs). Four Quadrature Phase Shift Keying (QPSK) symbols are mapped to each REG. The PDCCH can be transmitted using one or more CCEs, depending on the size of the Downlink Control Information (DCI) and the channel condition.

Open loop power control (OLPC) may be performed by the UE without dynamic signaling from the network. The purpose of the OLPC is to compensate for long-term channel variations such as pathloss attenuation and shadowing fading.

Propagation loss measurement for determining the pathloss (PL) may be performed based on one or more reference signals received in downlink, and the measured PL is used in identifying the first transmit power and/or second transmit power. The reference signals may be received in one or more subframes in the downlink. The PL may be measured for each power control parameter set (or power control loop) individually, so that the transmit power of the first signal may be controlled based on the PL measured using first one or more reference signals, whereas the transmit power of the second signal may be controlled based on the PL measured using second one or more reference signals. Further, the UE 202 may also learn the reference signal power indicating the power with which the reference signals are transmitted by the respective transmitting node from control plane signaling in the downlink. The pathloss may be determined by the UE 202 based on a comparison of a measure of the receive power of the reference signal(s) (e.g., RSRP) and the reference signal power. The reference signal(s) for pathloss determination may be one or more of: SSB or CSI-RS.

The transmit power may be further selected/identified based on a transmit power control (TPC) command received either in Downlink Control Information (DCI). The downlink control signaling may for example include a transmit power control (TPC) command for use in identifying the transmit power. The TPC command may be for example comprises in Downlink Control Information (DCI). For example, DCI Format 0, 1, 1A, 1B, 1D, 2, 2A, 2C, 2D, 3, 3 A of 4 as specified in 3GPP TS 38.213 v16.3.0 (2020-10-02) may carry the transmission control protocol (TCP) command. The DCI may be received on a downlink control channel, such as, for example, a PDCCH. The method may also include receiving one or more downlink signals. The downlink signals may comprise one or more reference signals for propagation loss measurements by the UE and propagation loss measurement for determining the pathloss (PL) may be performed based on one or more reference signals received in downlink.

Generally, carrier aggregation (CA) can be used to increase a data rate of user equipment (UE) communications. CA enables a UE to receive and/or transmit from/to multiple cells. The cells include a primary cell (PCell) in the case of a single cell group or a primary secondary cell (PSCell) in case of multiple cell groups. The cells also include a secondary cell (SCell) in both the single and multiple cell group cases. A SCell activation procedure may be performed, whereby the UE and the base station exchange information about the SCell. For instance, the base station sends a channel state information (CSI)-reference signal (RS) on the SCell to the UE, and, in turn, the UE performs measurements based on the CSI-RS and sends a CSI report.

Figure 3:
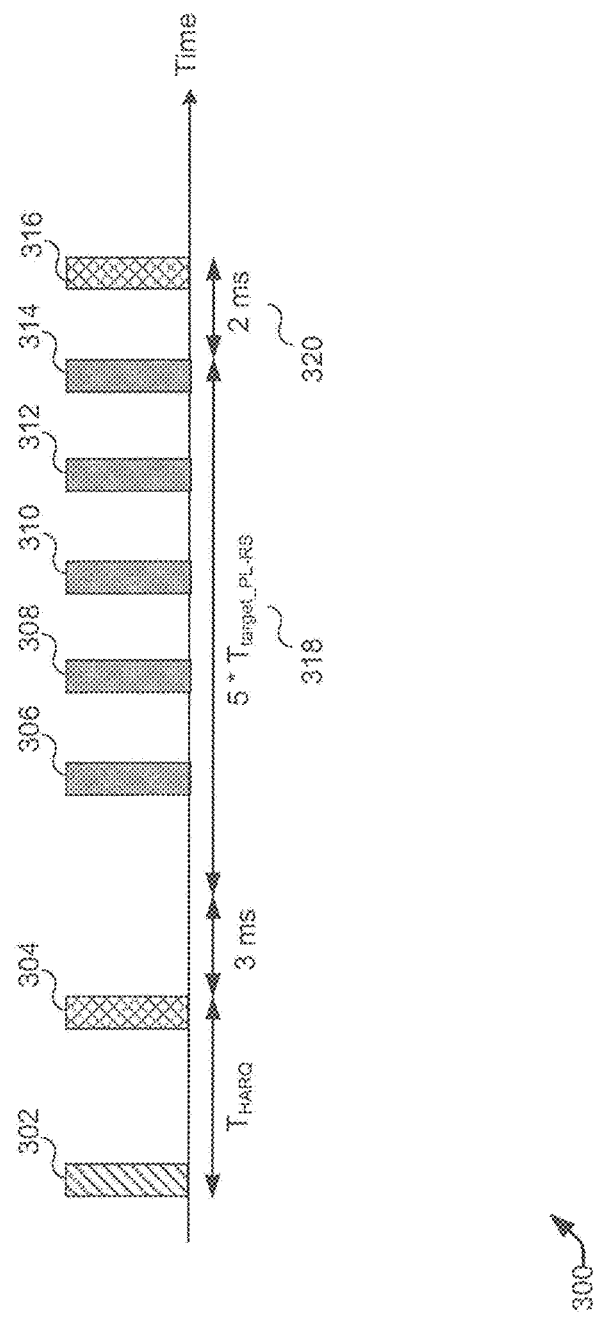
FIG. 3 illustrates an exemplary first timeline for updating a target pathloss reference signal.

FIG. 3 illustrates an exemplary first timeline 300 for updating a target pathloss reference signal. In 3GPP specification release 16, the pathloss reference signal (PL-RS) has been introduced and the requirement has been agreed to in 3GPP Technical Specification Group (TSG)-radio access network (RAN) Working Group 4 Meeting #96-e R4-2012148. The requirement applies for a UE to update a PL-RS by Medium Access Control-Control Element (MAC-CE) for PUCCH, PUSCH, semi-persistent SRS, and aperiodic SRS.

If the PL-RS is known upon receiving PDSCH carrying MAC-CE in slot n, the UE shall be able to apply the target PL-RS of the serving cell on which PL-RS switch occurs no later than the slot $$n + T_{HARQ} + \left\lceil \frac{3 \text{ ms} + 5*TtargetPL - RS + 2 \text{ ms}}{NR \text{ slot length}} \right\rceil.$$

The UE shall be able to apply old pathloss reference signals until the slot $n+T_{HARQ}+3N_{slot}^{subframe,\mu}$. Where timing hybrid automatic repeat request ($T_{HARQ}$) is the timing between pathloss reference MAC-CE activation command and acknowledgement as specified in 3GPP TS 38.213 v16.3.0 (2020-10-02). $T_{target\_PL-RS}$ is the periodicity of the target pathloss reference signal which would be Synchronization Signal Block (SSB) or Non-Zero Power Channel State Information Reference Signal (NZP CSI-RS). Longer application time is expected if measurement sample is not available due to measurement gap, Discontinuous Reception (DRX), or other UE activities. The longer application time is expected if the pathloss reference signal is unknown.

The base station can transmit a control signal 302 (e.g., MAC CE message) to the UE requesting the UE to update the PL-RS. In various embodiments, the UE can transmit an acknowledgement message 304 in response to the control signal 302. The base station may periodically transmit the pathloss reference signal within a first time period 318. The UE can measure the pathloss reference signal at 306, 308, 310, 312, and 314 to obtain samples that may be used to calculate an updated target pathloss reference signal. A processor of the UE may use the five samples to perform filtering or averaging or a combination thereof to determine a pathloss measurement. Five samples can be specified by the standard as a threshold to obtain a desired measurement accuracy. The UE can apply the target reference signal after a second time period 320. The second time period can be 2 milliseconds (ms) in duration. Here, under normal circumstances this target pathloss reference update will not be reported back to the base station or the network. The UE can apply the updated target PL-RS by adjusting the uplink transmission power of the UE based on a pathloss measurement derived from the target PL-RS. The adjusting the uplink power can include adding the pathloss calculation onto nominal transmission power.

The base station can receive the acknowledgement 304 from the UE. The network expects the UE to complete the adjustment to the uplink power control within the second time period as specified by the 3GPP specification. This type of power control can be known as open loop power control.

The periodicity of the update to the target pathloss reference can depend on network implementation. In some embodiments it can be conducted every 20 to 40 ms. The network may also configure beam management from the UE. The network can also determine that the current pathloss signal is not accurate or not reliable and the base station will command a new target pathloss signal from the UE.

Figure 4:
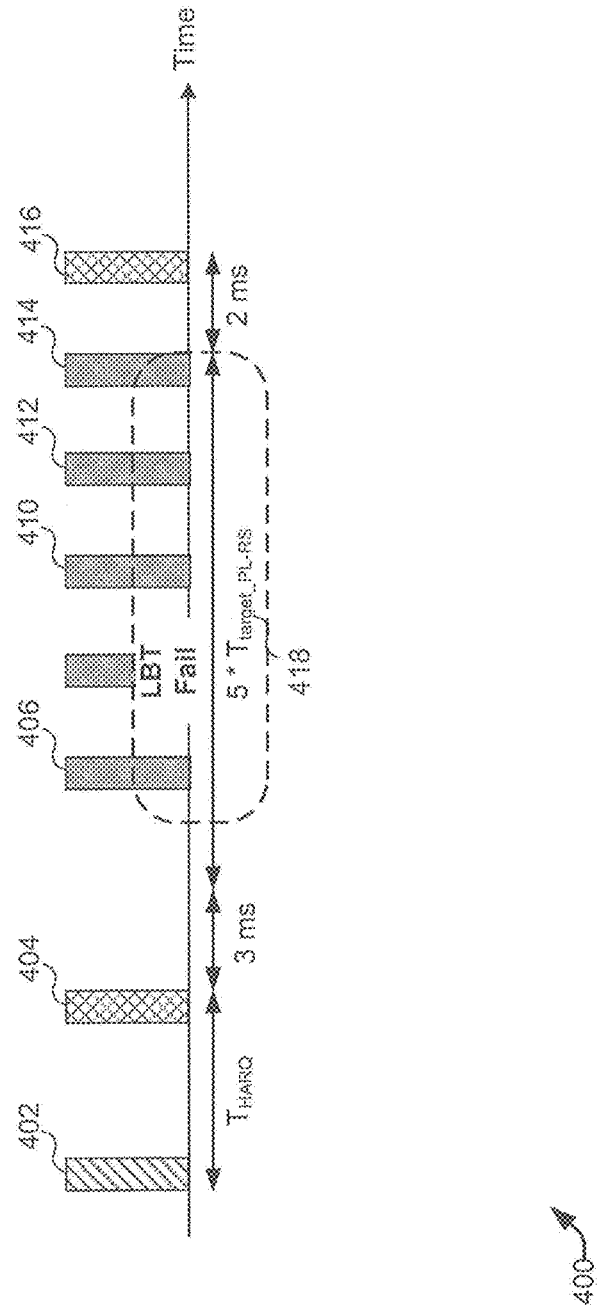
FIG. 4 illustrates an exemplary second timeline for updating a target pathloss reference signal.

FIG. 4 illustrates an exemplary second timeline 400 for updating a target pathloss reference signal. In the second timeline 400 the UE does not receive sufficient PL-RS samples to calculate an updated target pathloss reference signal. This inability to update the target pathloss reference signal can be due to several reasons (e.g., listen-before-talk (LBT) failure at the base station or cancellation of the periodical or semi-persistent PL-RS reception by the UE).

The base station can transmit a control signal 402 (e.g., MAC CE message) to the UE requesting the UE to update the PL-RS. In various embodiments, the UE can transmit an acknowledgement message 404 in response to the control signal 402. The base station may be scheduled to transmit a plurality of sample target pathloss reference signals within a first time period 418, which the UE may attempt to sample at 406, 410, 412, and 414 for calculating an updated target pathloss reference signal. However, due to an LBT failure, one or more instances of the target PL-RS may not be transmitted. Thus, the UE may not receive sufficient samples (for example, five samples as indicated by network requirements) and may be unable to update the PL-RS. Therefore, the commanded switch to the updated pathloss reference signal may fail. This may compromise operation as the uplink signals may not be transmitted with the proper uplink power. Insufficient transmission power may not enable the uplink signals to be detected above the background noise, and excessive transmission power may interfere with other UE transmissions.

To avoid these complications, various embodiments describe UE signaling of the switch failure to the network and further provide mitigation strategies for the UE to employ.

In various embodiments, the UE may fail to perform the PL-RS switch due to a number of reasons including, for example, the sample quality of the PL-RS quality being insufficient, a fading channel preventing the UE from receive sufficient samples of the PL-RS, or the base station not having access to a channel after a failed LBT operation. If the UE fails to perform the PL-RS switch, any of several techniques can be executed in accordance with some embodiments. Five options are described below in accordance with some embodiments. Aspects of these options may be used with one another. They are not mutually exclusive.

In option 1-1, the UE 202 may fall back to using a previous PL-RS for pathless estimation. The previous PL-RS can mean the configured active PL-RS used by the UE 202 before the UE 202 receive the PL-RS switch command. For example, the PL-RS that was active before the UE 202 receives the MAC CE at 402. In some embodiments, the UE 202 may use a pathloss estimation value stored in memory that is based on the previous PL-RS. In other embodiments, the UE 202 may take new samples of the previous PL-RS and determine a new pathloss estimation value based on the previous PL-RS.

In option 1-2, the UE 202 falls back to use the old PL-RS for pathless estimation, similar to option 1-1, and further indicates the PL-RS switch failure to the network. For example, upon detecting the PL-RS switch failure, the UE 202 may generate an uplink transmission that includes a switch-failure indication. The UE 202 may use an uplink transmit power for this uplink transmission that is based on a pathloss estimation determined from the previous PL-RS. The pathloss estimation may be one stored in memory or a new pathloss estimation calculated based on additional samples of the previous PL-RS.

In option 1-3, the UE 202 may use a maximum transmit power for the uplink transmission. The maximum uplink transmit power may be based on a network configuration for the serving cell in which the UE 202 is operating. In some embodiments, the maximum transmit power may be based on a power class of the UE 202 or the carrier frequency of the serving cell.

In option 1-4, the UE 202 may use a maximum transmit power for the uplink transmission, similar to the option 1-3, and may further indicate the PL-RS switch failure to the network. In some embodiments, the uplink transmission that includes the switch-failure indication may be transmitted with a maximum uplink transmit power similar to that used for other uplink transmissions after the switch failure.

In option 1-5, the UE 202 may use a maximum uplink transmit power for uplink transmissions and may provide an indication of the PL-RS switch failure to the network similar to the fourth option. However, in this option, the indication can be sent through an uplink control indicator. The UE can indicate the failure on uplink MAC-CE. The UE 202 may use an uplink transmit power for the transmission that includes the switch-failure indication based on a pathless estimation from the previous PL-RS. As discussed above, the path loss estimation may be stored in memory or newly calculated based on additional samples of the previous PL-RS.

In various embodiments, in the event the UE 202 does not initially receive sufficient samples, the UE 202 may extend the PL-RS reception period to receive sufficient samples for pathloss estimation. The UE 202 can extend the PL-RS reception period by $x*T_{target\_PL-RS}$, where x is the number of PL-RS occasions not available at the UE due to either LBT failure at the base station (e.g., gNB); or cancellation of PL-RS reception occasions.

In certain conditions, the UE 202 may cancel reception occasions of a CSI-RS that serves as a PL-RS. Canceling reception can include powering off or deactivating the radio frequency (RF) reception chain of the UE 202, such that a transmitted PL-RS is not received by the UE. Additionally or alternatively, canceling the PL-RS reception can include powering off or deactivating baseband processor of the UE 2022 such that a received PL-RS may not be processed.

In an example, the cancelation conditions can include the UE being configured for periodic/semi-persistent reception of PL-RS, but the configuration information sent to the UE being insufficient to perform the periodic/semi-persistent reception and/or amounting to an aperiodic reception configuration. For instance, in the case of New Radio-unlicensed (NR-U) where the frequency spectrum is shared between multiple RATs, 3GPP TS38.213 V16.3.0 (2020-10-02) specifies that "[f]or operation with shared spectrum channel access, if a UE is provided CSI-RS-ValidationWith-DCI-r16, is not provided CO-DurationPerCell-r16, and is not provided SlotFormatCombinationsPerCell, and if the UE is configured by higher layers to receive a CSI-RS in a set of symbols of a slot, the UE cancels the CSI-RS reception in the set of symbols of the slot if the UE does not detect a DCI format indicating an aperiodic CSI-RS reception or scheduling a PDSCH reception in the set of symbols of the slot." In other words, the UE 202 may cancel the CSI-RS if it is configured for periodic or semi-persistent CSI-RS reception (per the CSI-RS-ValidationWith-DCI-r16 parameter or other means), but does not have sufficient information for this type of reception in the case of an NR-U shared band because the channel occupancy and/or slot information are missing (e.g., has not received the CO-DurationPerCell-r16, and SlotFormatCombinationsPerCell parameters), DCI for Aperiodic-Channel State Information-Reference Signal (AP-CSI-RS) reception is not received, or scheduling information of PDSCH in the set of symbols is not received. Thus, in a similar manner, the UE 202 may cancel periodical or semi-persistent PL-RS reception if the UE 202 provided with CSI-validation with DCI parameter (for example, CSI-RS-ValidalionWith-DCf) but is not provided with a channel occupancy duration per cell parameter (for example, CO-DurationPerCell) or slot format indicator parameter (for example, SlotFormatIndicator) and does not detect a DCI format indicating an aperiodic CSI-RS reception or scheduling a PDSCH reception in a set of symbols of the slot in which the PL-RS is transmitted.

In some embodiments, an upper boundary may be imposed on extending the PL-RS reception period. For example, in some embodiments, the UE can extend the PL-RS reception period up to $x\_max*T_{target\_PL-RS}$, where $x<=x\_max$. In the event the unavailable PL-RS occasions exceed x_max, one or more of the following options may be implemented in accordance with embodiments.

In option 2-1, the UE 202 may abandon the PL-RS switch procedure and fall back to use the previous PL-RS for pathless estimation. Use of the previous PL-RS may be similar to that described above with respect to option 1-1.

In option 2-2, the UE 202 may abandon the PL-RS switch procedure and fall back to use the old PL-RS for pathless estimation. In this option, the UE may also transmit an uplink transmission with an indication of the PL-RS switch failure to the network. This option may be similar to option 1-2 with the uplink transmit power used for transmitting the switch-failure indication being based on the pathless estimation from the previous PL-RS.

In option 2-3, the UE 202 may use a maximum uplink transmit power for uplink transmissions following the switch failure. This option may be similar to option 1-3 discussed above.

In option 2-4, the UE 202 may use a maximum uplink transmit power for uplink transmissions after the switch failure and may further provide an indication of the PL-RS switch failure to network. This option may be similar to option 1-4 with the uplink transmit power used for transmitting the switch-failure indication being based on the maximum transmit power for the uplink transmission.

In option 2-5, the UE 202 may use a maximum uplink transmit power for uplink transmissions after the switch failure and may indicate the PL-RS switch failure to network similar to option 2-4. However, in this option, the uplink transmit power used for the switch-failure indication may be based on the pathless estimation from previous PL-RS similar to that described above with respect to option 1-5.

In various embodiments, the UE 202 will not extend the reception window for PL-RS estimation, and will use the received available PL-RS samples to estimate a pathloss for transmitter power control even though the available PL-RS sample is less than a predetermined threshold y. In some embodiments, the predetermined threshold y may be equal an expected sufficient sample number for PL-RS estimation. This value may be five according to TS 38.133. In other embodiments, other values that correspond to expected sufficient sample numbers may be used.

If within the window of $y*T_{target\_PL-RS}$, there is not any PL-RS available, several available options are possible.

In option 3-1, the UE 202 may fall back to use the old PL-RS for pathless estimation. For example, the UE 202 may obtain additional samples from the previous PL-RS and use those additional samples to determine a pathloss estimation that may be used for uplink transmissions following the switch failure.

In option 3-2, the UE 202 may fall back to use the old pathless estimation result. This may be a pathloss estimation result that is stored in memory that was based on previous samples of the previous PL-RS.

In option 3-3, the UE 202 may use the maximum transmit power for uplink transmission. The maximum transmit power may be similar to that described above with respect to option 1-3.

With any of options 3-1-3-3, the UE 202 may (or may not) indicate the PL-RS switch failure to the network similar to the reporting of switch-failure indications discussed above. The transmit power used for an uplink transmission that includes the switch-failure indication may be based on pathless estimation results from an old PL-RS; old pathless estimation results; or a maximum uplink transmit power.

In some embodiments, network operation may be enhanced to facilitate pathloss estimations based on a PL-RS in an NR-U environment. For example, in some embodiments the network may validate the PL-RS to UE through PHY or MAC indication.

For example, after a base station sends a PL-RS switch command to the UE 202 via MAC, base station may use DCI on PHY to indicate to the UE 202 the period in which the UE 202 can receive the available PL-RS. In these embodiments, the UE 202 may only need to measure the PL-RS during the available period as indicated in the DCI. In some embodiments, he UE 202 may be expected to complete the PL-RS measurement after y available samples periodicity. As discussed above, y may be an expected sufficient sample number, which may be five in the current TS 38.133.

In another example of validating the PL-RS, when the network uses a MAC CE to send UE the PL-RS switch command, the network may also include available time period information to guide the UE 202 to receive available PL-RS for pathless estimation. The UE 202 may only need to measure the PL-RS during this available period. Similar to the above example, the UE 202 may be expected to complete the PL-RS measurement after y available samples periodicity.

Figure 5:
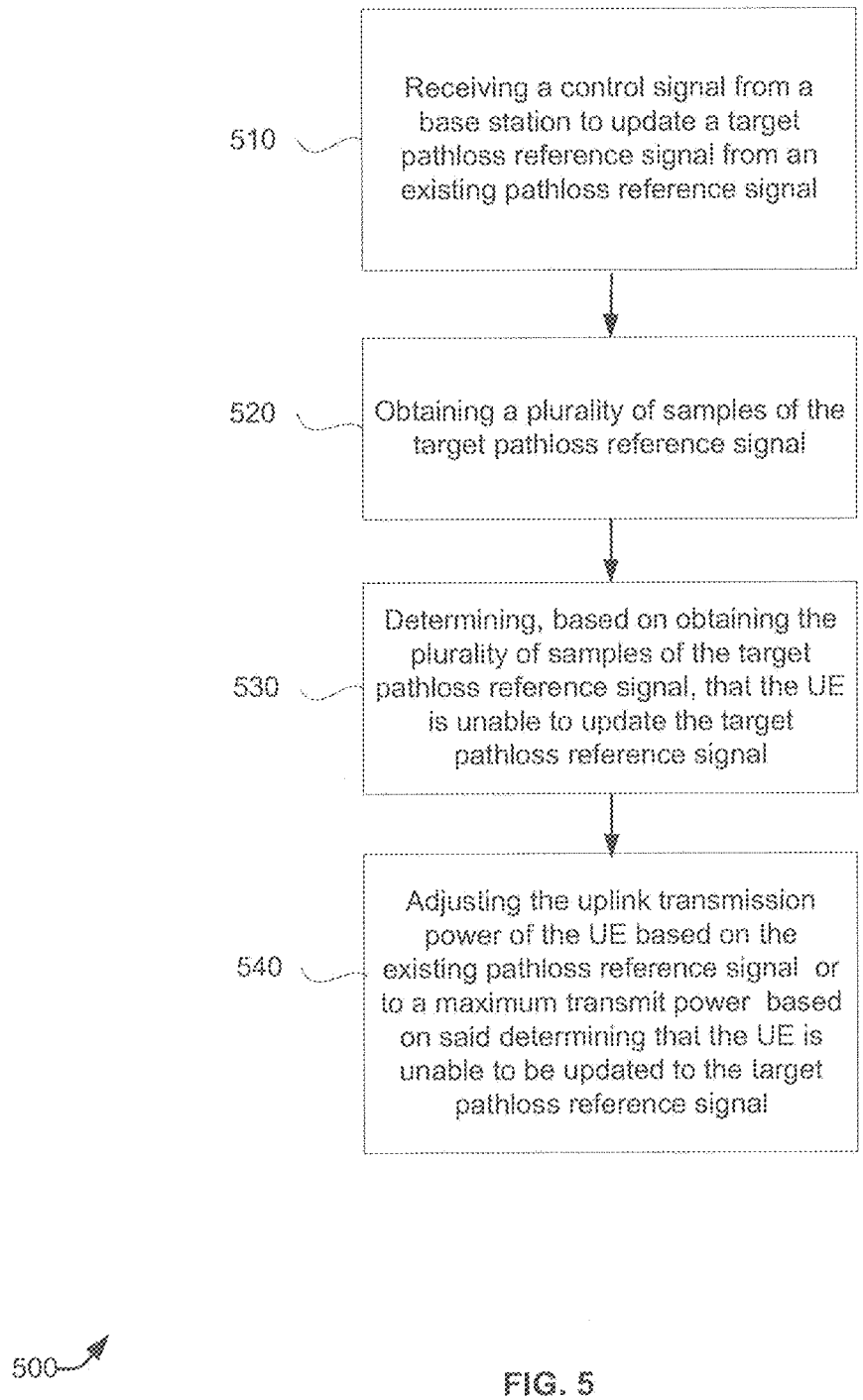
FIG. 5 illustrates a flow chart of an example process for techniques for pathloss reference signal enhancements.

FIG. 5 is a flow chart of an example process 500 for techniques for pathloss reference signal enhancements in accordance with some embodiments. In some implementations, one or more process blocks of FIG. 5 can be performed by a UE. In some implementations, one or more process blocks of FIG. 5 can be performed by another device or a group of devices separate from or including the UE.

Figure 9:
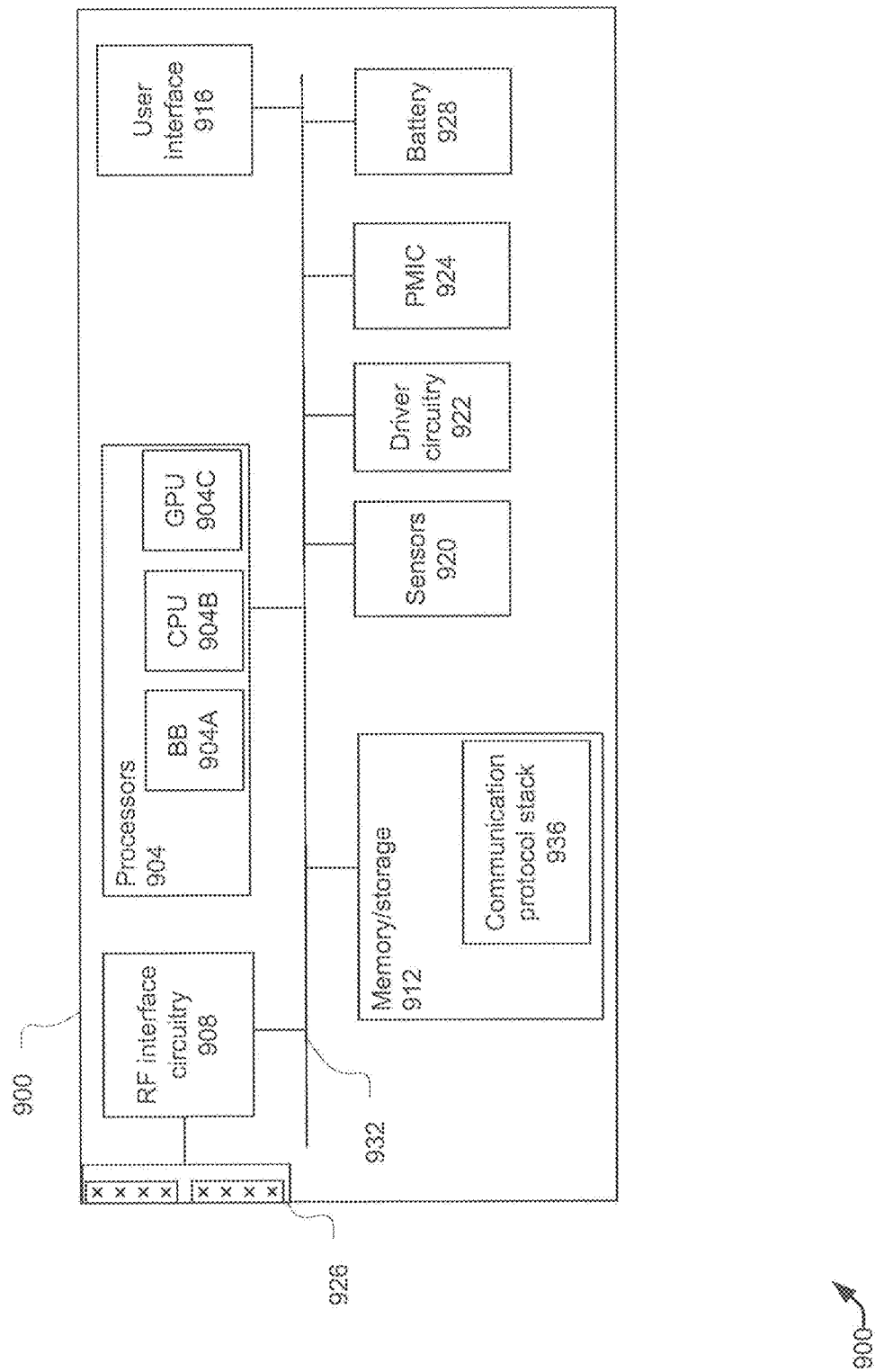
FIG. 9 illustrates a UE in accordance with some embodiments.

At 510, process 500 can include receiving a control signal from abase station to update a target pathloss reference signal from an existing pathloss reference signal. For example, the UE (including components, e.g., antenna 926, radio frequency (RF) interface circuitry 908, processors 904, and memory/storage 912, interconnects 932 and/or the like as illustrated in FIG. 9 as described below) can receive a control signal from a base station to update a target pathloss reference signal from an existing pathloss reference signal, as described above.

At 520, process 500 can include obtaining a plurality of samples of the target pathloss reference signal. For example, the UE (including components e.g., antenna 926, RF interface circuitry 908, processors 904, and memory/storage 912, interconnects 932 and/or the like as illustrated in FIG. 9 as described below) can obtain a plurality of samples of the target pathloss reference signal, as described above.

At 530, process 500 can include determining, based on obtaining the plurality of samples of the target pathloss reference signal, that the UE is unable to update the target pathloss reference signal. For example, the UE (including components e.g., antenna 926. RF interface circuitry 908, processors 904, and memory/storage 912, interconnects 932 and/or the like as illustrated in FIG. 9 as described below) can determine, based on obtaining the plurality of samples of the target pathloss reference signal, that the UE is unable to update the target pathloss reference signal, as described above.

At 540, process 500 can include adjusting the uplink transmission power of the UE based on the existing pathloss reference signal or to a maximum transmit power based on said determining that the UE is unable to be updated to the target pathloss reference signal. For example, the UE (including components e.g., antenna 926, RF interface circuitry 908, processors 904, and memory/storage 912, interconnects 932 and/or the like as illustrated in FIG. 9 as described below) can adjust the uplink transmission power of the UE based on the existing pathloss reference signal or to a maximum transmit power based on said determining that the UE is unable to be updated to the target pathloss reference signal, as described above.

Process 500 can include additional implementations, such as any single implementation or any combination of implementations described below and/or in connection with one or more other processes described elsewhere herein. It should be appreciated that the specific steps illustrated in FIG. 5 provide particular techniques for pathloss reference signal enhancements according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 5 can include multiple sub-steps that can be performed in various sequences as appropriate to the individual step. Furthermore, additional steps can be added or removed depending on the particular applications. One of ordinary skill in the art would recognize many variations, modifications, and alternatives.

In some implementations, adjusting the uplink transmission power is based on the existing pathloss reference signal and further includes calculating an uplink transmitter power based on a pathloss estimation from a previous pathloss reference signal stored in a memory.

In some implementations, process 500 includes sending a status message to a base station to indicate a failure of an update to the target pathloss reference signal.

In some implementations, adjusting the uplink transmission power is based on the maximum transmit power. The maximum transmit power is the standardized maximum transmission power for different UE types.

In some implementations, process 500 includes sending a status message, with the maximum transmit power, to a base station to indicate a failure of an update to the target pathloss reference signal.

In some implementations, process 500 includes sending a status message, with a transmit power based on the existing pathloss reference signal, to a base station to indicate a failure of an update to the target pathloss reference signal.

Although FIG. 5 shows example steps of process 500, in some implementations, process 500 can include additional steps, fewer steps, different steps, or differently arranged steps than those depicted in FIG. 5. Additionally, or alternatively, two or more of the steps of process 500 can be performed in parallel.

In various embodiments, a UE can include one or more memories; and one or more processors in communication with the one or more memories and configured to execute instructions stored in the one or more memories to performing operations of a method described above.

In various embodiments, a computer-readable medium storing a plurality of instructions that, when executed by one or more processors of a user device, cause the one or more processors to perform operations of any of the methods described above.

Figure 6:
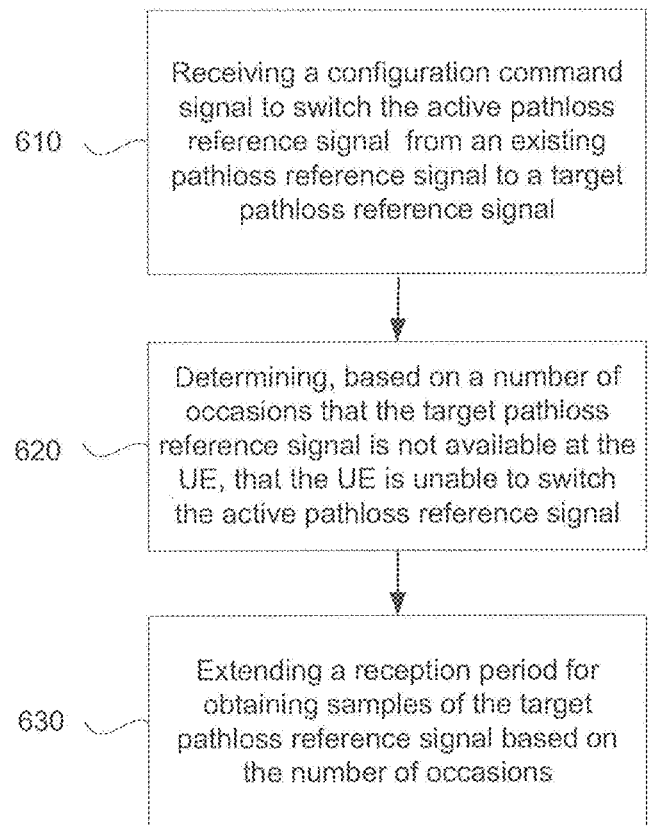
FIG. 6 illustrates is a flow chart of an example process for techniques for pathloss reference signal enhancements.

FIG. 6 is a flow chart of an example process 600 for techniques for pathloss reference signal enhancements. In some implementations, one or more process blocks of FIG. 6 can be performed by a UE. In some implementations, one or more process blocks of FIG. 6 can be performed by another device or a group of devices separate from or including the user equipment.

At 610, process 600 can include receiving a configuration command signal to switch the active pathloss reference signal from an existing pathloss reference signal to a target pathloss reference signal. For example, the UE (including components e.g., antenna 926, RF interface circuitry 908, processors 904, and memory/storage 912, interconnects 932 and/or the like as illustrated in FIG. 9 as described below) can receive a configuration command signal to switch the active pathloss reference signal from an existing pathloss reference signal to a target pathloss reference signal, as described above.

At 620, process 600 can include determining, based on a number of occasions that the target pathloss reference signal is not available at the UE, that the UE is unable to switch the active pathloss reference signal. For example, the UE (including components e.g., antenna 926, RF interface circuitry 908, processors 904, and memory/storage 912, interconnects 932 and/or the like as illustrated in FIG. 9 as described below) can determine, based on a number of occasions that the target pathloss reference signal is not available at the UE, that the UE is unable to switch the active pathloss reference signal, as described above.

At 630, process 60) can include extending a reception period, up to a maximum period, for obtaining samples of the target pathloss reference signal based on the number of occasions. For example, the UE (including components e.g., antenna 926, RF interface circuitry 908, processors 904, and memory/storage 912, interconnects 932 and/or the like as illustrated in FIG. 9 as described below) can extend a reception period for obtaining samples of the target pathloss reference signal based on the number of occasions, as described above.

Process 600 can include additional implementations, such as any single implementation or any combination of implementations described below and/or in connection with one or more other processes described elsewhere herein. It should be appreciated that the specific steps illustrated in FIG. 6 provide particular techniques for techniques for pathloss reference signal enhancements according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 6 can include multiple sub-steps that can be performed in various sequences as appropriate to the individual step. Furthermore, additional steps can be added or removed depending on the particular applications. One of ordinary skill in the art would recognize many variations, modifications, and alternatives.

In some implementations, process 600 includes determining the number of occasions that the target pathloss reference signal is not available at the UE.

In various embodiments, the target pathloss reference signal is a periodic or semi-persistent CSI-RS and the target pathloss reference signal is not available due to: UE cancellation of reception due to configuration condition or non-transmission of the CSI-RS due to LBT failure.

In various embodiments, the target pathloss reference signal is a SSB and the target pathloss reference signal is not available due to LBT failure.

In some implementations, process 600 includes detecting a configuration condition set based on: reception of a channel state information-reference signal (CSI-RS) validation with downlink is controlling information (DCI); non-reception of channel occupancy duration per cell and slot format indicator parameters; and non-detection of a DCI format to is indicating an aperiodic CSI-RS reception or scheduling a physical downlink shared channel reception in a slot in which the target pathloss reference signal is transmitted; and cancelling the periodical or semi-persistent reception of the target pathloss reference signal based on detection of the configuration condition.

In some implementations, the reception period is extended by x times a first time period for receiving one pathloss reference signal, wherein x is a number of pathloss reference signal reception opportunities not available at UE side, the maximum period is $x\_max$ times the first time period, and $x<=x\_max$.

In various implementations, process 600 can include: receiving a plurality of additional samples of the target pathloss reference signal; and if the additional samples of the target pathloss reference signal continue to be less than a threshold number of required samples of the target pathloss reference signal to update the target pathloss reference signal: configuring an active pathloss reference signal to a previous pathloss reference signal stored in a memory, wherein the previous pathloss reference signal was used by the user equipment prior to receiving the configuration command signal. The process can further include adjusting an uplink transmitter power of the UE based on the previous pathloss reference signal.

In various embodiments, process 600 can include receiving a plurality of additional samples of the target pathloss reference signal; and if the additional samples of the pathloss reference signal continue to be less than a threshold number of required samples of the target pathloss reference signal to update the target pathloss reference signal configure an uplink transmitter power of the user equipment to a maximum transmission power for an uplink transmission.

In various embodiments, process 600 can include receiving a plurality of additional samples of the target pathloss reference signal; and if the additional samples of the target pathloss reference signal continue to be less than a threshold number of required samples of the target pathloss reference signal to update the target pathloss reference signal: configuring an active pathloss reference signal to a previous pathloss reference signal stored in a memory, wherein the previous pathloss reference signal was used by the user equipment prior to receiving the configuration command signal; and adjusting an uplink transmitter power of the UE to the transmitter power prior to receiving the configuration command signal.

In various embodiments, process 600 can include sending a status message to a base station to indicate a failure of an update to the target pathloss reference signal.

In various embodiments, a user equipment can include one or more memories; and one or more processors in communication with the one or more memories and configured to execute instructions stored in the one or more memories to performing operations of a method described above.

In various embodiments, a computer-readable medium storing a plurality of instructions that, when executed by one or more processors of a user device, cause the one or more processors to perform operations of any of the methods described above.

Although FIG. 6 shows example steps of process 600, in some implementations, process 600 can include additional steps, fewer steps, different steps, or differently arranged steps than those depicted in FIG. 6. Additionally, or alternatively, two or more of the steps of process 600 can be performed in parallel.

Figure 7:
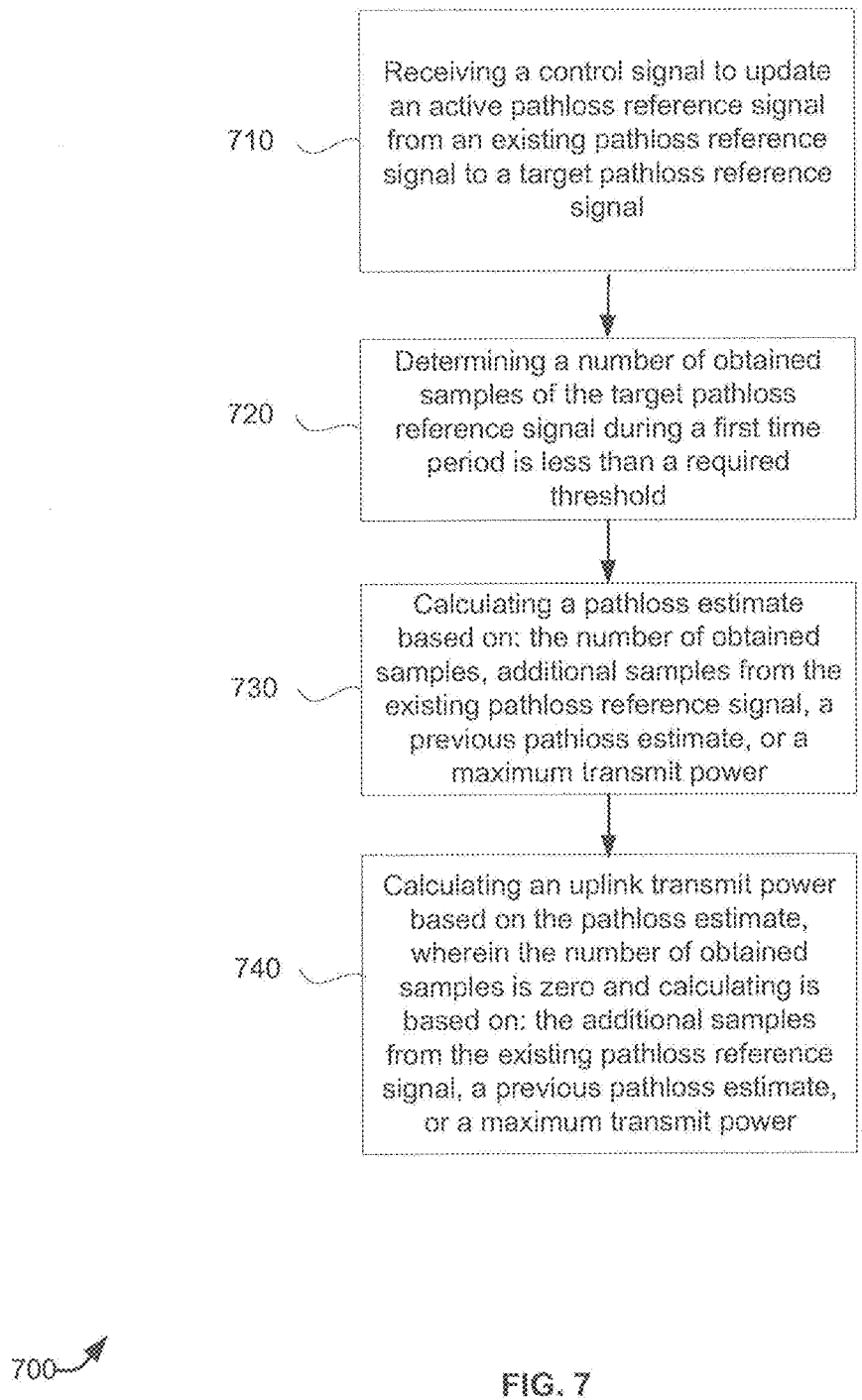
FIG. 7 illustrates is a flow chart of an example process for techniques for pathloss reference signal enhancements.

FIG. 7 is a flow chart of an example process 700 for adjusting an uplink transmission power of a user equipment (UE) based on pathloss reference signal measurements. In some implementations, one or more process blocks of FIG. 7 can be performed by a UE. In some implementations, one or more process blocks of FIG. 7 can be performed by another device or a group of devices separate from or including the base station.

At 710, process 700 can include receiving a control signal to update an active pathloss reference signal from an existing pathloss reference signal to a target pathloss reference signal. For example, the UE (including components e.g., antenna 926, RF interface circuitry 908, processors 904, and memory/storage 912, interconnects 932 and/or the like as illustrated in FIG. 9 as described below) can receive a control signal to update an active pathloss reference signal from an existing pathloss reference signal to a target pathloss reference signal, as described above.

At 720, process 700 can include determining a number of obtained samples of the target pathloss reference signal during a first time period is less than a required threshold. For example, the UE (including components e.g., antenna 926, RF interface circuitry 908, processors 904, and memory/storage 912, interconnects 932 and/or the like as illustrated in FIG. 9 as described below) can determine a number of obtained samples of the target pathloss reference signal during a first time period is less than a required threshold, as described above.

At 730, process 700 can include calculating a pathloss estimate based on: the number of obtained samples, additional samples from the existing pathloss reference signal, a previous pathloss estimate, or a maximum transmit power. For example, the UE (including components e.g., antenna 926, RF interface circuitry 908, processors 904, and memory/storage 912, interconnects 932 and/or the like as illustrated in FIG. 9 as described below) can calculate a pathloss estimate based on: the number of obtained samples, additional samples from the existing pathloss reference signal, a previous pathloss estimate, or a maximum transmit power, as described above.

At 740, process 700 can include calculating an uplink transmit power based on the pathloss estimate, wherein the number of obtained samples is zero and calculating is based on: the additional samples from the existing pathloss reference signal, a previous pathloss estimate, or a maximum transmit power. For example, the UE (including components e.g., antenna 926, RF interface circuitry 908, processors 904, and memory/storage 912, interconnects 932 and/or the like as illustrated in FIG. 9 as described below) can calculate an uplink transmit power based on the pathloss estimate, as described above. In some implementations, the number of obtained samples is zero and calculating is based on: the additional samples from the existing pathloss reference signal, a previous pathloss estimate, or a maximum transmit power.

Process 700 can include additional implementations, such as any single implementation or any combination of implementations described below and/or in connection with one or more other processes described elsewhere herein. It should be appreciated that the specific steps illustrated in FIG. 7 provide particular techniques for techniques for pathloss reference signal enhancements according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 7 can include multiple sub-steps that can be performed in various sequences as appropriate to the individual step. Furthermore, additional steps can be added or removed depending on the particular applications. One of ordinary skill in the art would recognize many variations, modifications, and alternatives.

In some implementations, process 700 includes if no sample pathloss reference signals are received during the first time period: configuring an active pathloss reference signal to a previous pathloss reference signal stored in a memory, wherein the previous pathloss reference signal was used by the user equipment prior to receiving the control signal; and configuring an uplink transmitter power based on a previous pathloss reference signal prior to receiving the control signal.

In some implementations, process 700 includes if no sample pathloss reference signals are received during the first time period: configure an active pathloss reference signal to a previous pathloss reference signal stored in a memory, wherein the previous pathloss reference signal was used by the user equipment prior to receiving the control signal; and configuring an uplink transmitter power based on a previous pathloss reference signal prior to receiving the control signal.

In some implementations, process 700 includes if no sample pathloss reference signals are received during the first time period: configuring an uplink transmitter power of the user equipment to a maximum transmission power for an uplink transmission.

In some implementations, process 700 includes if no sample pathloss reference signals is being received during the first time period: configuring an active pathloss reference signal to a previous pathloss reference signal stored in a memory, wherein the previous pathloss reference signal was used by the user equipment prior to receiving the control signal; and configuring an uplink transmitter power of the user equipment uplink transmission power prior to receiving the control signal.

In various embodiments, process 700 includes sending a status message to a base station indicating a failure of an update to the target pathloss reference signal.

In various embodiments, a user equipment can include one or more memories; and one or more processors in communication with the one or more memories and configured to execute instructions stored in the one or more memories to performing operations of a method described above.

In various embodiments, a computer-readable medium storing a plurality of instructions that, when executed by one or more processors of a user device, cause the one or more processors to perform operations of any of the methods described above.

Although FIG. 7 shows example steps of process 700, in some implementations, process 700 can include additional steps, fewer steps, different steps, or differently arranged steps than those depicted in FIG. 7. Additionally, or alternatively, two or more of the steps of process 700 can be performed in parallel.

Figure 8:
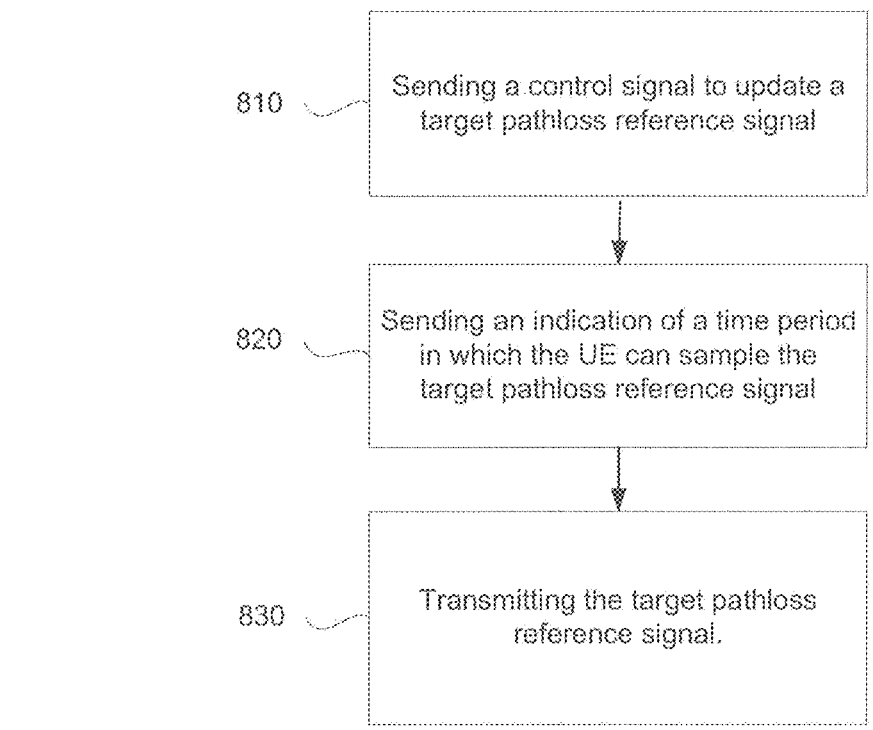
FIG. 8 illustrates a flow chart of an example process for techniques for pathloss reference signal enhancements.

FIG. 8 is a flow chart of an example process 800 for techniques for pathloss reference signal enhancements. In some implementations, one or more process blocks of FIG. 8 can be performed by a base station. In some implementations, one or more process blocks of FIG. 8 can be performed by another device or a group of devices separate from or including the user equipment.

Figure 10:
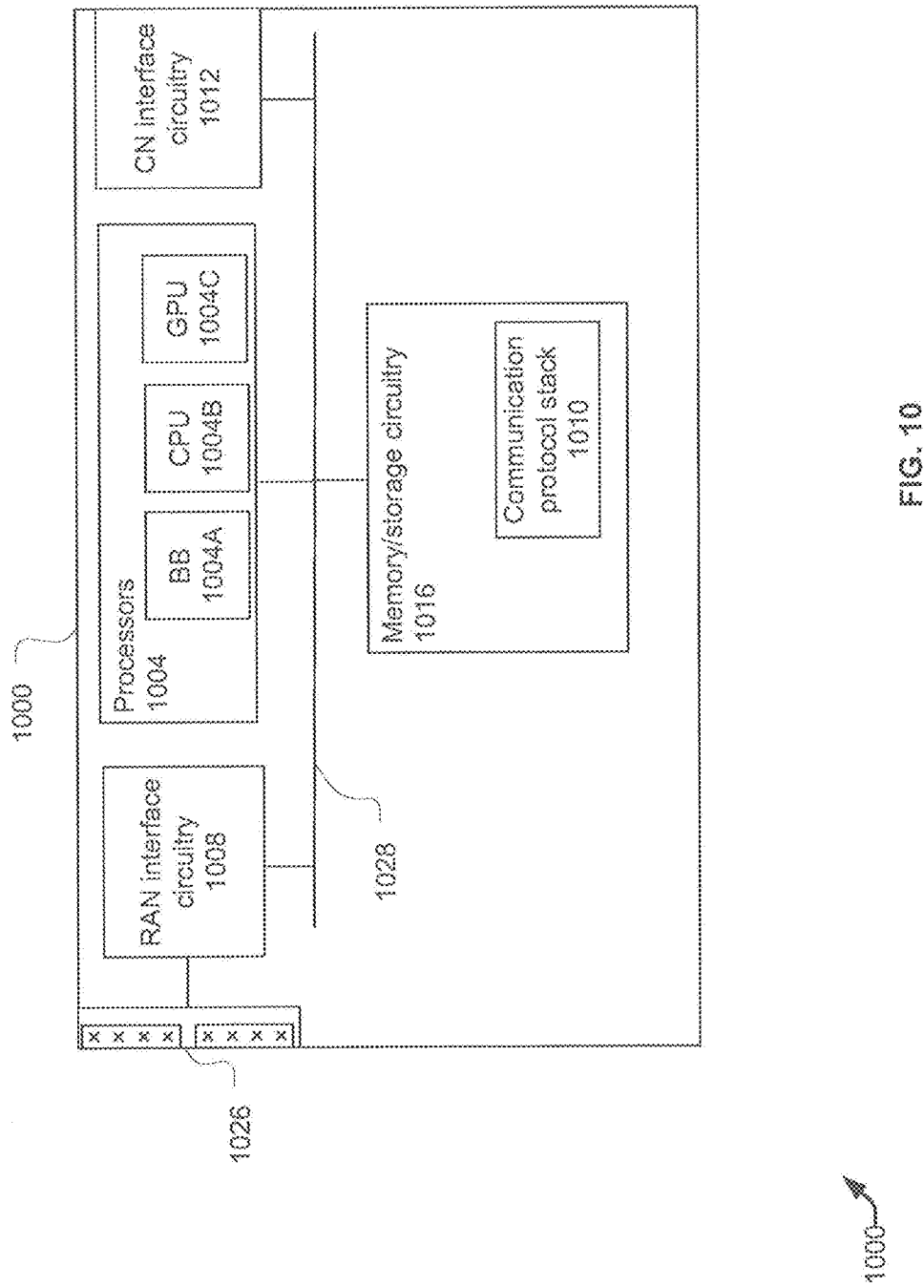
FIG. 10 illustrates a base station in accordance with some embodiments.

At 810, process 800 can include sending a control signal to update a target pathloss reference signal. For example, the base station (e.g., gNB 1000) (e.g., using processors 1004, RAN interface circuitry 1008, interconnects 1028, antenna 1026, CN interface circuitry 1012, memory 1016, and/or the like as illustrated in FIG. 10 and described below) can send a control signal to update a target pathloss reference signal, as described above.

At 820, process 800 can include sending an indication of a time period in which the UE can sample the target pathloss reference signal. For example, the base station (e.g., gNB 1000) (e.g., using processors 1004, RAN interface circuitry 1008, interconnects 1028, antenna 1026, CN interface circuitry 1012, memory 1016, and/or the like as illustrated in FIG. 10 and described below) can send an indication of a time period in which the UE can sample the target pathloss reference signal.

At 830, process 800 can include transmitting the target pathloss reference signal. For example, the base station (e.g., gNB 1000) (e.g., using processors 1004, RAN interface circuitry 1008, interconnects 1028, antenna 1026, CN interface circuitry 1012, memory 1016, and/or the like as illustrated in FIG. 10 and described below) can adjust an uplink transmission power of the UE in an absence of an update to the target pathloss reference signal, as described above.

Process 800 can include additional implementations, such as any single implementation or any combination of implementations described below and/or in connection with one or more other processes described elsewhere herein. It should be appreciated that the specific steps illustrated in FIG. 8 provide particular techniques for techniques for pathloss reference signal enhancements according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 8 can include multiple sub-steps that can be performed in various sequences as appropriate to the individual step. Furthermore, additional steps can be added or removed depending on the particular applications. One of ordinary skill in the art would recognize many variations, modifications, and alternatives.

In some implementations, process 800 includes sending the indication of the time period in a downlink control information on a physical layer.

In some implementations, wherein the control signal comprises a media access control (MAC) control element (CE) and the operations further comprise: sending the indication of the time period in the MAC CE.

Although FIG. 8 shows example steps of process 800, in some implementations, process 800 can include additional steps, fewer steps, different steps, or differently arranged steps than those depicted in FIG. 8. Additionally, or alternatively, two or more of the steps of process 800 can be performed in parallel.

In various embodiments, a user equipment can include one or more memories; and one or more processors in communication with the one or more memories and configured to execute instructions stored in the one or more memories to performing operations of a method described above.

In various embodiments, a computer-readable medium storing a plurality of instructions that, when executed by one or more processors of a user device, cause the one or more processors to perform operations of any of the methods described above.

FIG. 9 illustrates a UE 900 in accordance with some embodiments. The UE 90 may be similar to and substantially interchangeable with UE 102 of FIG. 1.

The UE 900 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.) video surveillance/monitoring devices (for example, cameras, video cameras, etc.) wearable devices; Internet-of-Things (IoT) devices.

The UE 900 may include processors 904, RF interface circuitry 908, memory/storage 912, user interface 916, sensors 920, driver circuitry 922, power management integrated circuit (PMIC) 924, and battery 928. The components of the UE 900 may be implemented as integrated circuits (ICs), portions thereof, discrete electronic devices, or other modules, logic, hardware, software, firmware, or a combination thereof. The block diagram of FIG. 9 is intended to show a high-level view of some of the components of the UE 900. However, some of the components shown may be omitted, additional components may be present, and different arrangement of the components shown may occur in other implementations.

The components of the UE 900 may be coupled with various other components over one or more interconnects 932, which may represent any type of interface, input/output, bus (local, system, or expansion), transmission line, trace, optical connection, etc. that allows various circuit components (on common or different chips or chipsets) to interact with one another.

The processors 904 may include processor circuitry such as, for example, baseband processor circuitry (BB) 904A, central processor unit circuitry (CPU) 904B, and graphics processor unit circuitry (GPU) 904C. The processors 904 may include any type of circuitry or processor circuitry that executes or otherwise operates computer-executable instructions, such as program code, software modules, or functional processes from memory/storage 912 to cause the UE 900 to perform operations as described herein.

In some embodiments, the baseband processor circuitry 904A may access a communication protocol stack 936 in the memory/storage 912 to communicate over a 3GPP compatible network. In general, the baseband processor circuitry 904A may access the communication protocol stack to: perform user plane functions at a PHY layer, MAC layer, RLC layer, Packet Data Convergence Protocol (PDCP) layer, service data adaption protocol (SDAP) layer, and packet data unit (PDU) layer; and perform control plane functions at a physical (PHY) layer. MAC layer. RLC layer, PDCP layer, radio resource control (RRC) layer, and a non-access stratum (NAS) layer. In some embodiments, the PHY layer operations may additionally/alternatively be performed by the components of the RF interface circuitry 908.

The baseband processor circuitry 904A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The baseband processor circuitry 904A may access instructions that cause the UE to perform positioning measurements in an unlicensed spectrum and signal corresponding positioning capabilities as described herein.

The memory/storage 912 may include any type of volatile or non-volatile memory that may be distributed throughout the UE 900. In some embodiments, some of the memory/storage 912 may be located on the processors 904 themselves (for example, L1 and L2 cache), while other memory/storage 912 is external to the processors 904 but accessible thereto via a memory interface. The memory/storage 912 may include any suitable volatile or non-volatile memory such as, but not limited to, dynamic random access memory (DRAM), static random access memory (SRAM), erasable programmable read only memory (EPROM), electrically erasable programmable read only memory (EEPROM). Flash memory, solid-state memory, or any other type of memory device technology.

The RF interface circuitry 908 may include transceiver circuitry and radio frequency front-end module (RFEM) that allows the UE 900 to communicate with other devices over a radio access network. The RF interface circuitry 908 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 926 and proceed to filter and amplify (with a low-noise amplifier) the signal. The signal may be provided to a receiver of the transceiver that down-converts the RF signal into a baseband signal that is provided to the baseband processor of the processors 904.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 926.

In various embodiments, the RF interface circuitry 908 may be configured to transmit/receive signals in a manner compatible with NR access technologies.

The antenna 926 may include a number of antenna elements that each convert electrical signals into radio waves to travel through the air and to convert received radio waves into electrical signals. The antenna elements may be arranged into one or more antenna panels. The antenna 926 may have antenna panels that are omnidirectional, directional, or a combination thereof to enable beamforming and multiple input, multiple output communications. The antenna 926 may include microstrip antennas, printed antennas fabricated on the surface of one or more printed circuit boards, patch antennas, phased array antennas, etc. The antenna 926 may have one or more panels designed for specific frequency bands including bands in FR1 or FR2.

The user interface circuitry 916 includes various input/output (I/O) devices designed to enable user interaction with the UE 900. The user interface 916 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs). LED displays, quantum dot displays, projectors, etc.), with the output of characters, graphics, multimedia objects, and the like being generated or produced from the operation of the UE 900.

The sensors 920 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like), depth sensors, ambient light sensors, ultrasonic transceivers: microphones or other like audio capture devices; etc.

The driver circuitry 922 may include software and hardware elements that operate to control particular devices that are embedded in the UE 900, attached to the UE 900, or otherwise communicatively coupled with the UE 900. The driver circuitry 922 may include individual drivers allowing other components to interact with or control various input/output (I/O) devices that may be present within, or connected to, the UE 900. For example, driver circuitry 922 may include a display driver to control and allow access to a display device, a touchscreen driver to control and allow access to a touchscreen interface, sensor drivers to obtain sensor readings of sensor circuitry 920 and control and allow access to sensor circuitry 920, drivers to obtain actuator positions of electro-mechanic components or control and allow access to the electro-mechanic components, a camera driver to control and allow access to an embedded image capture device, audio drivers to control and allow access to one or more audio devices.

The PMIC 924 may manage power provided to various components of the UE 900. In particular, with respect to the processors 904, the PMIC 924 may control power-source selection, voltage scaling, battery charging, or direct current (DC)-to-DC conversion.

In some embodiments, the PMIC 924 may control, or otherwise be part of, various power saving mechanisms of the UE 900. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 900 may power down for brief intervals of time and thus save power. If there is no data traffic activity for an extended period of time, then the UE 900 may transition off to an RRC_Idle state, where it disconnects from the network and does not perform operations such as channel quality feedback, handover, etc. The UE 900 goes into a very low power state and it performs paging where again it periodically wakes up to listen to the network and then powers down again. The UE 900 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 928 may power the UE 900, although in some examples the UE 900 may be mounted deployed in a fixed location, and may have a power supply coupled to an electrical grid. The battery 928 may be a lithium ion battery, a metal-air battery, such as a zinc-air battery, an aluminum-air battery, a lithium-air battery, and the like. In some implementations, such as in vehicle-based applications, the battery 928 may be a typical lead-acid automotive battery.

FIG. 10 illustrates a gNB 1000 in accordance with some embodiments. The gNB 1000 may similar to and substantially interchangeable with the base station 104 of FIG. 1.

The gNB 1000 may include processors 1004, RF interface circuitry 1008, core network (CN) interface circuitry 1012, memory/storage circuitry 1016, and antenna structure 1026. The components of the gNB 1000 may be coupled with various other components over one or more interconnects 1028.

The processors 1004, RF interface circuitry 1008, memory/storage circuitry 1016 (including communication protocol stack 1010), antenna 1024, and interconnects 1028 may be similar to like-named elements shown and described with respect to FIG. 9.

The processors 1004 may execute instructions to cause the gNB 1000) to perform positioning signaling and operations as described with respect to the base station 104 as described herein.

The CN interface circuitry 1012 may provide connectivity to one or more components of a core network, for example, a 5G core network (5GCN) (e.g., 5G core network 220 shown in FIG. 2) using a 5GCN-compatible network interface protocol such as carrier Ethernet protocols, or some other suitable protocol. Network connectivity may be provided to/from the gNB 1000 via a fiber optic or wireless backhaul. The CN interface circuitry 1012 may include one or more dedicated processors or FPGAs to communicate using one or more of the aforementioned protocols. In some implementations, the CN interface circuitry 1012 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 is a method for adjusting an uplink transmission power of a user equipment (UE) based on pathloss reference signal measurements, the method comprising: receiving a control signal from a base station to update a target pathloss reference signal from an existing pathloss reference signal; obtaining a plurality of samples of the target pathloss reference signal; determining, based on obtaining the plurality of samples of the target pathloss reference signal, that the UE is unable to update the target pathloss reference signal; and adjusting the uplink transmission power of the UE based on the existing pathloss reference signal or to a maximum transmit power based on said determining that the UE is unable to be updated to the target pathloss reference signal.

Example 2 is the method of example 1, wherein adjusting the uplink transmission power is based on the existing pathloss reference signal and further comprises: calculating an uplink transmitter power based on a pathloss estimation from a previous pathloss reference signal stored in a memory.

Example 3 is the method of example 2, further comprising: sending a status message to a base station to indicate a failure of an update to the target pathloss reference signal.

Example 4 is the method of example 1, wherein adjusting the uplink transmission power is based on the maximum transmit power.

Example 5 is the method of example 4, further comprising: sending a status message, with the maximum transmit power, to a base station to indicate a failure of an update to the target pathloss reference signal.

Example 6 is the method of example 4, further comprising: sending a status message, with a transmit power based on the existing pathloss reference signal, to a base station to indicate a failure of an update to the target pathloss reference signal.

Example 7 is a method for adjusting an uplink transmission power of a user equipment (UE) based on pathloss reference signal delays, the method comprising: receiving a configuration command signal to switch the active pathloss reference signal from an existing pathloss reference signal to a target pathloss reference signal: determining, based on a number of occasions that the target pathloss reference signal is not available at the UE, that the UE is unable to switch the active pathloss reference signal; and extending a reception period, up to a maximum period, for obtaining samples of the target pathloss reference signal based on the number of occasions.

Example 8 is the method of example 7, further comprising: determining the number of occasions that the target pathloss reference signal is not available at the UE.

Example 9 is the method of example 7, wherein the target pathloss reference signal is a periodic or semi-persistent CSI-RS and the target pathloss reference signal is not available due to: UE cancellation of reception due to configuration condition or non-transmission of the CSI-RS due to LBT failure.

Example 10 is the method of example 8, wherein the target pathloss reference signal is a SSB and the target pathloss reference signal is not available due to LBT failure.

Example 11 is the method of example 9, further comprising: detecting a configuration condition based on: reception of a channel state information-reference signal (CSI-RS) validation with downlink control information (DCI): non-reception of channel occupancy duration per cell and slot format indicator parameters; and non-detection of a DCI format to indicate an aperiodic CSI-RS reception or scheduling a physical downlink shared channel reception in a slot in which the target pathloss reference signal is transmitted; and cancelling the periodical or semi-persistent reception of the target pathloss reference signal based on detection of the configuration condition.

Example 12 is the method of example 7, wherein the reception period is extended by x times a first time period for receiving one pathloss reference signal, wherein x is a number of pathloss reference signal reception opportunities not available at UE side, the maximum period is x_max times the first time period, and x<=x_max.

Example 13 is the method of examples 7-12, further comprising: receiving a plurality of additional samples of the target pathloss reference signal; and if the additional samples of the target pathloss reference signal continue to be less than a threshold number of required samples of the target pathloss reference signal to update the target pathloss reference signal: configuring an active pathloss reference signal to a previous pathloss reference signal stored in a memory, wherein the previous pathloss reference signal was used by the user equipment prior to receiving the configuration command signal; and adjusting an uplink transmitter power of the UE based on the previous pathloss reference signal.

Example 14 is the method of any one of examples 7-12, further comprising: receiving a plurality of additional samples of the target pathloss reference signal; and if the additional samples of the pathloss reference signal continue to be less than a threshold number of required samples of the target pathloss reference signal to update the target pathloss reference signal; configuring an uplink transmitter power of the user equipment to a maximum transmission power for an uplink transmission.

Example 15 is the method of any one of examples 7-12, further comprising receiving a plurality of additional samples of the target pathloss reference signal; and if the additional samples of the target pathloss reference signal continue to be less than a threshold number of required samples of the target pathloss reference signal to update the target pathloss reference signal: configuring an active pathloss reference signal to a previous pathloss reference signal stored in a memory, wherein the previous pathloss reference signal was used by the user equipment prior to receiving the configuration command signal; and adjusting an uplink transmitter power of the UE to the transmitter power prior to receiving the configuration command signal.

Example 16 is the method of any one of examples 13-15, further comprising sending a status message to a base station to indicate a failure of an update to the target pathloss reference signal.

Example 17 is a method for adjusting an uplink transmission power of a user equipment (UE) based on pathloss reference signal delays, the method comprising: receiving a control signal to update an active pathloss reference signal from an existing pathloss reference signal to a target pathloss reference signal; determining a number of obtained samples of the target pathloss reference signal during a first time period is less than a required threshold; calculating a pathloss estimate based on: the number of obtained samples, additional samples from the existing pathloss reference signal, a previous pathloss estimate, or a maximum transmit power; and calculating an uplink transmit power based on the pathloss estimate, wherein the number of obtained samples is zero and calculating is based on: the additional samples from the existing pathloss reference signal, a previous pathloss estimate, or a maximum transmit power.

Example 18 is the method of example 17, further comprising: if no sample pathloss reference signals are received during the first time period: configuring an active pathloss reference signal to a previous pathloss reference signal stored in a memory, wherein the previous pathloss reference signal was used by the user equipment prior to receiving the control signal; and configuring an uplink transmitter power based on a previous pathloss reference signal prior to receiving the control signal.

Example 19 is the method of example 17, further comprising: if no sample pathloss reference signals are received during the first time period: configuring an uplink transmitter power of the user equipment to a maximum transmission power for an uplink transmission.

Example 20 is the method of example 17, further comprising: if no sample pathloss reference signals are received during the first time period: configuring an active pathloss reference signal to a previous pathloss reference signal stored in a memory, wherein the previous pathloss reference signal was used by the user equipment prior to receiving the control signal; and configuring an uplink transmitter power of the user equipment to the uplink transmission power prior to receiving the control signal.

Example 21 is the method of any one of examples 18 to 20, further comprising sending a status message to a base station indicating a failure of an update to the target pathloss reference signal.

Example 22 is a method for adjusting an uplink transmission power of a user equipment (UE) based on pathloss reference signal delays, the method comprising: sending a control signal to update a target pathloss reference signal; sending an indication of a time period in which the UE can sample the target pathloss reference signal; and transmitting the target pathloss reference signal.

Example 23 is the method of example 22, further comprising: sending the indication of the time period in a downlink control information on a physical layer.

Example 24 is the method of example 22, wherein the control signal comprises a media access control (MAC) control element (CE) and the operations further comprise: sending the indication of the time period in the MAC CE.

Example 25 may include an apparatus comprising means to perform one or more elements of a method described in or related to any of examples 1-24, or any other method or process described herein.

Example 26 may include one or more non-transitory computer-readable media comprising instructions to cause an electronic device, upon execution of the instructions by one or more processors of the electronic device, to perform one or more elements of a method described in or related to any of examples 1-24, or any other method or process described herein.

Example 27 may include an apparatus comprising logic, modules, or circuitry to perform one or more elements of a method described in or related to any of examples 1-24, or any other method or process described herein.

Example 28 may include a method, technique, or process as described in or related to any of examples 1-24, or portions or parts thereof.

Example 29 may include an apparatus comprising: one or more processors and one or more computer-readable media comprising instructions that, when executed by the one or more processors, cause the one or more processors to perform the method, techniques, or process as described in or related to any of examples 1-24, or portions thereof.

Example 30 may include a signal as described in or related to any of examples 1-24, or portions or parts thereof.

Example 31 may include a datagram, information element, packet, frame, segment. PDU, or message as described in or related to any of examples 1-24, or portions or parts thereof, or otherwise described in the present disclosure.

Example 32 may include a signal encoded with data as described in or related to any of examples 1-24, or portions or parts thereof, or otherwise described in the present disclosure.

Example 33 may include a signal encoded with a datagram, information element (IE), packet, frame, segment, PDU, or message as described in or related to any of examples 1-24, or portions or parts thereof, or otherwise described in the present disclosure.

Example 34 may include an electromagnetic signal carrying computer-readable instructions, wherein execution of the computer-readable instructions by one or more processors is to cause the one or more processors to perform the method, techniques, or process as described in or related to any of examples 1-24, or portions thereof.

Example 35 may include a computer program comprising instructions, wherein execution of the program by a processing element is to cause the processing element to carry out the method, techniques, or process as described in or related to any of examples 1-24, or portions thereof.

Example 36 may include a signal in a wireless network as shown and described herein.

Example 37 may include a method of communicating in a wireless network as shown and described herein.

Example 38 may include a system for providing wireless communication as shown and described herein.

Example 39 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
processing a control signal from a base station to switch from a first pathloss (PL)-reference signal (RS) to a second PL-RS;
obtaining a plurality of samples of the second PL-RS in a reception period;
determining, based on obtaining the plurality of samples of the second PL-RS in the reception period, for a first time that a user equipment (UE) is unable to switch to the second PL-RS;
obtaining, based on said determining for the first time that the UE is unable to switch to the second PL-RS, one or more additional samples of the second PL-RS in an extension of the reception period;
determining, based on obtaining the one or more additional samples of the second PL-RS in the extension of the reception period, for a second time that the UE is unable to switch to the second PL-RS; and
using the first PL-RS, based on said determining for the second time that the UE is unable to switch to the second PL-RS, for calculating an uplink transmission power of the UE.

2. The method of claim 1, further comprising:
calculating an uplink transmitter power based on a PL estimation from the first PL-RS stored in a memory.

3. The method of claim 1, further comprising:
generating a status message to be provided to the base station to indicate a failure of switching to the second PL-RS.

4. The method of claim 1, further comprising:
generating a status message, with a maximum transmit power, to be provided to the base station to indicate a failure of switching to the second PL-RS.

5. The method of claim 1, further comprising:
generating a status message, with a transmit power based on the first PL-RS, to a base station to indicate a failure of switching to the second PL-RS.

6. An apparatus comprising:
processing circuitry configured to:
    process a control signal from a base station to switch from a first pathloss (PL)-reference signal (RS) to a second PL-RS;
    obtain a plurality of samples of the second PL-RS in a reception period;
    determine, based on obtaining the plurality of samples of the second PL-RS in the reception period, for a first time that a user equipment (UE) is unable to switch to the second PL-RS;
    obtain, based on said determine for the first time that the UE is unable to switch to the second PL-RS, one or more additional samples of the second PL-RS in an extension of the reception period;
    determine, based on obtaining the one or more additional samples of the second PL-RS in the extension of the reception period, for a second time that the UE is unable to switch to the second PL-RS; and
    use the first PL-RS, based on said determine for the second time that the UE is unable to switch to the second PL-RS, for calculating an uplink transmission power of the UE; and
memory interface circuitry coupled with the processing circuitry, to store information associated with the first PL-RS.

7. The apparatus of claim 6, wherein the processing circuitry is further configured to:
calculate the uplink transmission power based on a PL estimation from the first PL-RS stored in a memory.

8. The apparatus of claim 6, wherein the processing circuitry is further configured to:
generate a status message to be provided to the base station to indicate a failure of switching to the second PL-RS.

9. The apparatus of claim 6, wherein the processing circuitry is further configured to:
generate a status message, with a maximum transmit power, to be provided to the base station to indicate a failure of switching to the second PL-RS.

10. The apparatus of claim 6, wherein the processing circuitry is further configured to:
generate a status message, with a transmit power based on the first PL-RS, to be provided to the base station to indicate a failure of switching to the second PL-RS.

11. One or more non-transitory, computer-readable media having instructions that, when executed, cause processing circuitry to:
process a control signal from a base station to switch from a first pathloss (PL)-reference signal (RS) to a second PL-RS;
obtain a plurality of samples of the second PL-RS in a reception period;
determine, based on the plurality of samples of the second PL-RS in the reception period, for a first time that a user equipment (UE) is unable to switch to the second PL-RS;
obtaining, based on said determining for the first time that the UE is unable to switch to the second PL-RS, one or more additional samples of the second PL-RS in an extension of the reception period;
determining, based on obtaining the one or more additional samples of the second PL-RS in the extension of the reception period, for a second time that the UE is unable to switch to the second PL-RS; and
use the first PL-RS, based on determination for the second time that the UE is unable to switch to the second PL-RS, for calculating an uplink transmission power of the UE.

12. The one or more non-transitory, computer-readable media of claim 11, wherein the instructions, when executed, further cause the processing circuitry to:
calculate the uplink transmission power based on a PL estimation from the first PL-RS stored in a memory.

13. The one or more non-transitory, computer-readable media of claim 11, wherein the instructions, when executed, further cause the processing circuitry to:
generate a status message to be provided to the base station to indicate a failure of switching to the second PL-RS.

14. The one or more non-transitory, computer-readable media of claim 11, wherein the instructions, when executed, further cause the processing circuitry to:
generate a status message, with a maximum transmit power, to be provided to the base station to indicate a failure of switching to the second PL-RS.

* * * * *